No. 652,947. Patented July 3, 1900.
M. BARTH.
APPARATUS FOR SUCCESSIVELY REPRESENTING MOVABLE OR IMMOVABLE PICTURES OR ADVERTISEMENTS.
(Application filed July 5, 1899.)
(No Model.) 2 Sheets—Sheet 1.
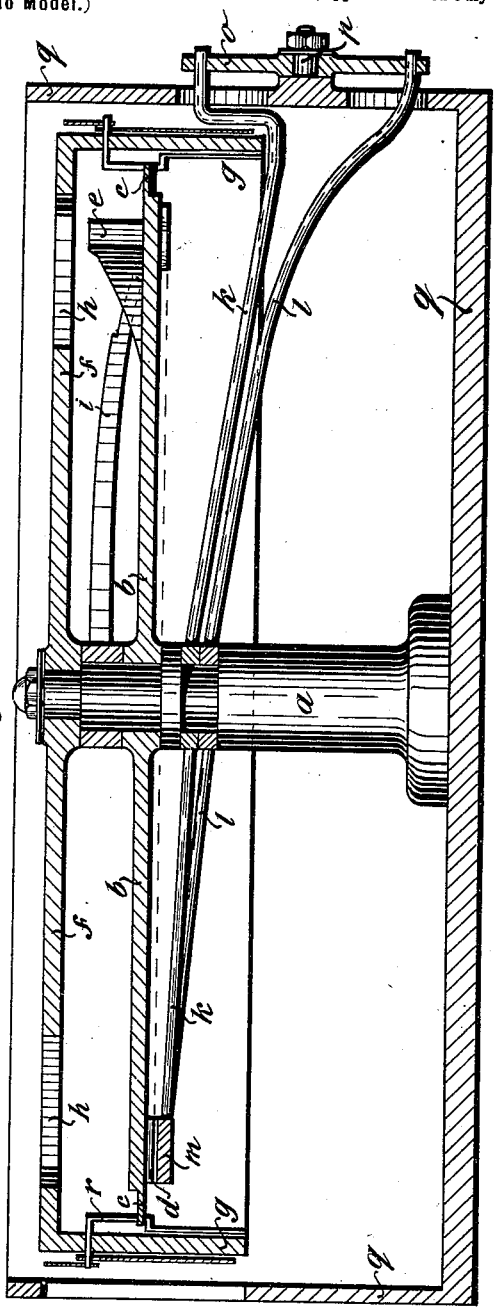
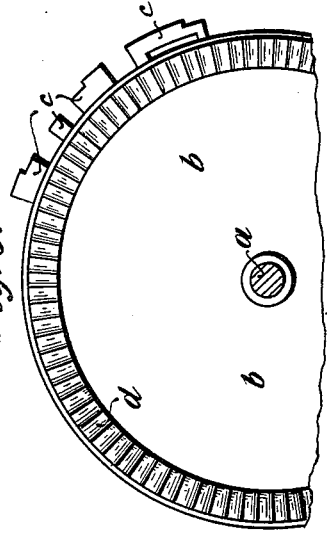
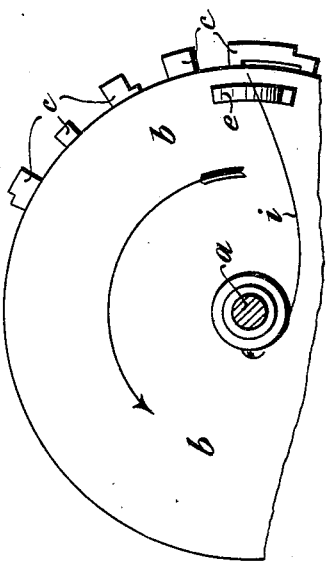
Witnesses:
G. S. Noble
J. Buehler
Inventor.
Moritz Barth
by B. Singer
Att'y.

No. 652,947. Patented July 3, 1900.
M. BARTH.
APPARATUS FOR SUCCESSIVELY REPRESENTING MOVABLE OR IMMOVABLE PICTURES OR ADVERTISEMENTS.
(Application filed July 5, 1899.)
(No Model.) 2 Sheets—Sheet 2.
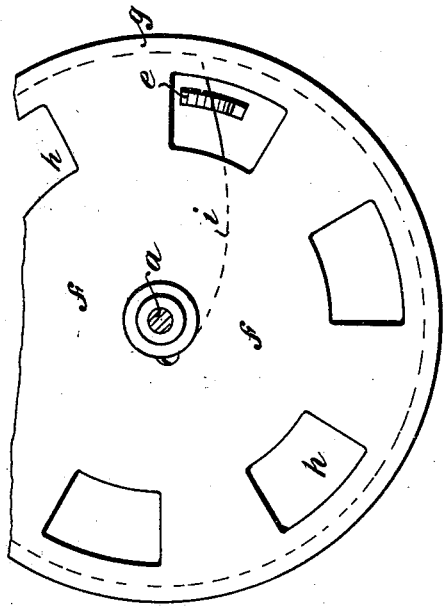
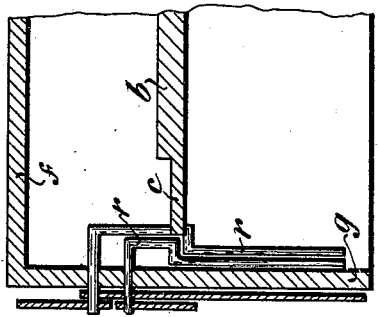
Witnesses:
G. S. Noble
J. Buehler.
Inventor,
Moritz Barth
by H. Singer
Att'y.

UNITED STATES PATENT OFFICE.

MORITZ BARTH, OF BERLIN, GERMANY.

APPARATUS FOR SUCCESSIVELY REPRESENTING MOVABLE OR IMMOVABLE PICTURES OR ADVERTISEMENTS.

SPECIFICATION forming part of Letters Patent No. 652,947, dated July 3, 1900.

Application filed July 5, 1899. Serial No. 722,814. (No model.)

*To all whom it may concern:*

Be it known that I, MORITZ BARTH, a subject of the King of Prussia, German Emperor, residing at No. 8 Frucht street, in the city of Berlin, in the Kingdom of Prussia, German Empire, have invented certain new and useful Improvements in Apparatus for Successively Representing Movable Pictures or Advertisements, of which the following is a specification.

This invention refers to apparatus of the kind in which pictures or advertisements are successively exposed to view; and my improvements in apparatus of this kind relate to certain combinations and arrangements of parts, as are fully described hereinafter.

In order to make my invention more clear, I refer to the accompanying drawings, in which similar letters denote similar parts throughout the several views, and in which—

Figure 1 is a vertical section through my improved apparatus. Fig. 2 is a plan of the disk serving to operate the picture-drum. Fig. 3 is a bottom view of the disk shown in Fig. 2. Fig. 4 is a plan of the picture-drum itself. Fig. 5 shows the device for operating the aforementioned disk. Figs. 6 and 7 represent the means for actuating the movable figures used in connection with this apparatus.

The main form of construction is as follows: The vertical axle $a$ supports a disk $b$, the rim or periphery of which is provided with projections or teeth having desired configurations or shapes. The disk $b$ is furnished on its lower face with a circle of teeth $d$ and at its upper side with an elongated stop $e$, that is inclined in the direction of rotation of said disk.

The axle $a$ carries loosely a drum $f$, having a downwardly-extending rim $g$. The latter takes over and around the disk $b$ and on its outer periphery is furnished with the advertisements or movable pictures or figures to be exposed to view. The drum $f$ is provided with holes $h$, and the axle $a$ is provided with a fixed spring $i$, which rotates in the path of the stop $e$.

Two elastic double-armed levers $k\ l$ are arranged to rotate around the axle $a$, the relative position of the former being such that they represent a kind of a pair of scissors. Each of said levers has at one end teeth $m\ n$, taking between the teeth $d$ of the disk $b$, and the other ends of the said levers are movably connected by a small rocking lever $o$, fulcrumed at $p$ to the stationary frame $q$ of the apparatus.

If the lever $o$ is made to rock, as indicated at the right-hand side of Fig. 5, then also the teeth $m$ and $n$ are moved to and fro; but the direction of movement of one tooth is contrary to that of the other. The configuration of the teeth $m\ n$ is such that they act upon the disk $b$ only in one direction, as indicated by the arrow, Fig. 2, whereas otherwise they simply glide along over the teeth of said disk without actuating it. The disk $b$ is thus alternately actuated by said teeth $m$ and $n$, so that by the alternating movement of the levers $k\ l$ a rotary movement of the disk $b$ is caused. The oscillatory movement of the lever $o$ may be effected by hand or by any mechanical device. The disk $b$ when having attained a certain position causes the inclined stop $e$ to take the spring $i$ with it, so as to put the latter under tension. The spring is, however, also somewhat raised in consequence of the inclination of the stop $e$, and owing thereto it takes with its free end into one or the other of the holes $h$ of the disk $f$. The latter is thus turned by the spring until this latter leaves the stop $e$, so that by that movement of the disk $f$ another advertisement or picture or figure is made to coincide with the view-opening of the apparatus. The disk remains then at rest until the stop $e$ again operates the spring $i$.

When representing movable figures—for instance, men or animals with movable heads or limbs—I prefer to attach them to the periphery of the rim $g$ in a manner as follows: The pivots of the movable parts of the figures pass through the rim or cylinder $g$ and form in the interior of the latter levers $r$, that hang freely down. If now the picture or figure drum that consists of the disk $f$ and the cylinder $g$ is at rest and the disk $b$ is rotated, the projections or teeth $c$ of this disk push against the levers $r$ and turn them so as to cause them to perform oscillatory movements, in consequence of which the movable parts of the figures are actuated and the latter produce comical effects. Owing to the widely-different shape and position of the projections c a very great change in the kind of movement of said movable parts is attained. In order to let the levers r have a suitable length without preventing them from gliding off the projections c, in proper time said levers are curved in the manner shown in Fig. 7.

The mechanism shown in Fig. 5 may well be replaced by a crank device, a clockwork, or the like, and the picture or figure drum may be exchangeable.

Having now described my invention, what I desire to secure by Letters Patent of the United States is—

1. A device for representing pictures, composed of a frame, an axle rotatably mounted therein, a disk mounted on said axle and provided with peripheral projections, a drum loosely mounted on said axle and having figures secured to its periphery, said figures being adapted to be operated by the projections on said disk, means for turning said drum from said disk, and means for rotating the latter, substantially as set forth.

2. A device for representing pictures, composed of a suitable frame, an axle rotatably mounted therein, a disk mounted on said axle and provided with different-shaped peripheral projections, a drum loosely mounted on said axle and having figures movably secured to its periphery, said figures having pendulums adapted to be engaged by the projections on the disk, means for rotating said drum, and means for rotating said disk, substantially as set forth.

3. A device for representing pictures, composed of a frame having an opening therein, an axle rotatably mounted in said frame, a disk mounted on said axle and provided with different-shaped peripheral projections, a drum loosely mounted on said axle and having figures movably secured to its periphery, said figures having pendulums adapted to be engaged by said projections, reciprocating arms for rotating said disk, and means for operating said drum from said disk, substantially as set forth.

In testimony whereof I have affixed my signature in presence of two witnesses.

MORITZ BARTH.

Witnesses:
WOLDEMAR HAUPT,
HENRY HASPER.